United States Patent
Thalhofer (10) Patent No.: US 9,228,487 B2
(45) Date of Patent: Jan. 5, 2016

(54) SUPERCHARGER FOR INTERNAL COMBUSTION ENGINES

(75) Inventor: Augustin Thalhofer, Langenneufnach (DE)

(73) Assignee: D. Brown Technik AG (DE)

( * ) Notice: Subject to any disclaimer, the term of this patent is extended or adjusted under 35 U.S.C. 154(b) by 0 days.

(21) Appl. No.: 13/702,958

(22) PCT Filed: Jun. 7, 2011

(86) PCT No.: PCT/EP2011/059385
§ 371 (c)(1),
(2), (4) Date: Dec. 7, 2012

(87) PCT Pub. No.: WO2011/154400
PCT Pub. Date: Dec. 15, 2011

(65) Prior Publication Data
US 2013/0074813 A1    Mar. 28, 2013

(30) Foreign Application Priority Data
Jun. 9, 2010    (DE) .......................... 10 2010 023 188

(51) Int. Cl.
*F02B 33/44*    (2006.01)
*F02B 33/00*    (2006.01)
(Continued)

(52) U.S. Cl.
CPC .................. *F02B 33/00* (2013.01); *F02B 33/40* (2013.01); *F02B 33/44* (2013.01); *F02B 33/446* (2013.01); *F02B 39/10* (2013.01); *F02D 23/005* (2013.01);
(Continued)

(58) Field of Classification Search
CPC .......... F02B 33/40; F02B 33/00; F02B 39/10; F02M 35/10229; Y02T 10/144

USPC ..................... 60/607, 608, 611, 612; 123/562
See application file for complete search history.

(56) References Cited

U.S. PATENT DOCUMENTS 4,453,381 A * 6/1984 Dinger ........................... 60/612
4,814,675 A    3/1989 Perilhon
(Continued)

FOREIGN PATENT DOCUMENTS

DE    837940    7/1949
DE    2912950    10/1980
(Continued)

OTHER PUBLICATIONS

Japan Patent Office, Office Action, Nov. 18, 2013, in connection with related Japanese Patent Application No. 2013-513664, 6 pages.
(Continued)

*Primary Examiner* — Thai Ba Trieu
*Assistant Examiner* — Ngoc T Nguyen
(74) *Attorney, Agent, or Firm* — Kolisch Hartwell, P.C.

(57) ABSTRACT

A supercharger for an internal combustion engine including a turbocompressor having at least one compressor impeller and a suction side and a pressure side, a flywheel mass for storing drive energy, an auxiliary motor for driving the compressor impeller and the flywheel mass, and a first shut-off element which is arranged on the suction side of the turbocompressor, the region between the first shut-off element and the compressor impeller of the turbocompressor forming a suction-side compressor air space, and the turbocompressor being designed in such a way that, after the first shut-off element is closed, the suction side compressor air space can be substantially evacuated.

16 Claims, 3 Drawing Sheets (51) Int. Cl.
  *F02B 33/40* (2006.01)
  *F02B 39/10* (2006.01)
  *F02D 23/00* (2006.01)
  *F02M 35/10* (2006.01)

(52) U.S. Cl.
  CPC ... *F02M 35/10157* (2013.01); *F02M 35/10229* (2013.01); *F02M 35/10275* (2013.01); *Y02T 10/144* (2013.01)

(56) References Cited

U.S. PATENT DOCUMENTS

| | | | |
|---|---|---|---|
| 5,457,366 A | | 10/1995 | Wehberg et al. |
| 5,904,471 A | | 5/1999 | Woollenweber et al. |
| 5,925,998 A | | 7/1999 | Olson |
| 6,798,161 B2 | | 9/2004 | Suzuki |
| 6,938,420 B2 | * | 9/2005 | Kawamura et al. ............. 60/612 |
| 7,246,490 B2 | * | 7/2007 | Sumser et al. ............... 60/605.2 |
| 2006/0260304 A1 | * | 11/2006 | Ishiwatari ....................... 60/599 |
| 2009/0000298 A1 | * | 1/2009 | Barthelet ......................... 60/608 |
| 2010/0051363 A1 | * | 3/2010 | Inoue et al. ................ 180/65.26 |
| 2010/0095914 A1 | | 4/2010 | Evans-Beauchamp |
| 2011/0030658 A1 | * | 2/2011 | Ulrey et al. .................. 123/521 |

FOREIGN PATENT DOCUMENTS

| | | | | |
|---|---|---|---|---|
| DE | 3100732 | | 7/1982 | |
| DE | 3322171 | | 1/1985 | |
| DE | 10321387 | | 12/2004 | |
| DE | 102004011251 | | 10/2005 | |
| DE | 102004026796 | | 12/2005 | |
| DE | 102005012837 | | 9/2006 | |
| EP | 1070837 | | 1/2001 | |
| EP | 1391595 | | 2/2004 | |
| GB | 2186023 A | * | 8/1987 | ............. F02B 37/04 |
| GB | 2214979 | | 9/1989 | |
| GB | 2303719 | | 2/1997 | |
| JP | 19891163421 | | 6/1989 | |
| JP | 2000110570 | | 4/2000 | |
| WO | 2005119027 | | 12/2005 | |

OTHER PUBLICATIONS

The International Bureau of WIPO, International Preliminary Report on Patentability, Dec. 10, 2012, in connection with related Application No. PCT/EP2011/059385, 7 pages.

* cited by examiner

SUPERCHARGER FOR INTERNAL COMBUSTION ENGINES

I. FIELD OF APPLICATION

The invention relates to a supercharger for an internal combustion engine which comprises a turbocompressor having at least one compressor impeller and having a suction side and a pressure side, a flywheel mass for storing drive energy, an auxiliary motor for driving the compressor impeller and the flywheel mass, and a first shut-off element which is arranged on the suction side of the turbocompressor, the region between the first shut-off element and the compressor impeller of the turbocompressor forming a suction-side compressor air space, and the turbocompressor being designed in such a way that, after the first shut-off element is closed, the suction-side compressor air space can be substantially evacuated, preferably exclusively by means of the inherent compressor capacity of the turbocompressor.

II. TECHNICAL BACKGROUND

It is known to compress the air which is fed to an internal combustion engine for the combustion in the cylinders by way of exhaust gas turbochargers which are driven by the exhaust gas energy of the internal combustion engine or by way of mechanical superchargers. A performance increase of the internal combustion engine is achieved as a result. If mechanical superchargers are used, they can be driven directly by the internal combustion engine, for example via a belt drive, or they can be driven by an auxiliary motor, for example an electric motor.

If the air which is fed to the internal combustion engine is compressed by an exhaust gas turbocharger, it is known that, in the case of sudden load requests, for example during the transition from the part load range into the full load range during acceleration of a vehicle which is driven by way of the internal combustion engine, the exhaust gas turbocharger is not capable of providing the charge air quantity which is required to provide the torque which is requested from the internal combustion engine. This effect is frequently also called "turbo lag". This is caused by the fact that the existing exhaust gas energy is not sufficient to drive the turbocharger in such a way that the desired boost pressure can be provided. Inertia of the turbocharger also leads to a delay in the build up of boost pressure occurring.

These problems are solved firstly by structural changes of the turbocharger, for example by turbochargers with a variable turbine geometry. Another solution which is known in the prior art consists of providing an electric motor on the shaft of the turbocharger (what is known as an "electrically assisted exhaust gas turbocharger").

A third option consists of providing a mechanically driven supercharger in addition to the exhaust gas turbocharger, which supercharger provides boost pressure only when, on account of sudden load requests, the exhaust gas turbocharger is not capable of providing the required boost pressure immediately, that is to say is subject to turbo lag. Here, the mechanical supercharger can in principle be driven by the internal combustion engine, as is also predominantly the case in mechanical superchargers which are used exclusively to supercharge the internal combustion engine. Since, here, the mechanical supercharger assists merely the exhaust gas turbocharger at certain operating points, however, assisting mechanical superchargers of this type are predominantly driven not by the internal combustion engine itself, but rather by a dedicated auxiliary motor.

In order, during this turbo lag, for it to be possible for the missing, required boost pressure which is not provided by the exhaust gas turbocharger to be provided by the mechanically driven additional supercharger, the latter has to have a very short response time. If the mechanical supercharger is driven only when it is required for the provision of the charge air, delays occur as a result of the running up of the mechanical supercharger. For running up, the superchargers which currently respond most quickly require a start up time in the order of magnitude of from 350 to 400 ms. If the mechanical supercharger is driven by an electric motor, a very high current consumption by the electric motor occurs during this running up. However, a current consumption of this type is not permissible in the case of conventional 12 volt vehicle on-board electrical systems, since it can lead to considerable voltage dips. It lies in the order of magnitude of 350 A starting current and 250 A steady current in the case of an output power in the order of magnitude of 2.6 kW.

III. SUMMARY OF THE INVENTION a) Technical Object

The invention is therefore based on the object of providing a mechanically driven supercharger (called a "supercharger" in the following text) for an internal combustion engine, which supercharger can be provided for compensating for what is known as the turbo lag, in particular in the context of the assistance of an exhaust gas turbocharger, and therefore can provide the required boost pressure immediately when required, and the energy consumption of which is minimized at the same time. Moreover, the invention is based on the object of providing a method for operating a supercharger of this type, which method firstly makes rapid provision of the requested boost pressure possible, and in the process secondly limits both the energy consumption of the supercharger, as viewed over the entire service life, and the maximum energy consumption which occurs at individual operating points.

b) Achievement of the Object

This object is achieved by a supercharger having the features of claim 1 and by a method having the features of claim 9. Further features of the invention result from the subclaims.

A supercharger according to the present invention comprises a turbocompressor, a flywheel mass, an auxiliary motor and at least one first shut-off element. The turbocompressor has at least one compressor impeller and a suction side and a pressure side. The pressure side is that side of the compressor impeller of the turbocompressor, on which the compressed charge air is at the higher pressure. The pressure side is therefore that side of the turbocompressor which lies closer to the internal combustion engine in the usual flow direction of the charge air.

The turbocompressor, flywheel mass and auxiliary motor are connected mechanically to one another by being arranged, for example, on a common shaft. The turbocompressor and the flywheel mass are driven by the auxiliary motor. Drive energy for driving the turbocompressor during the turbo lag is stored in the flywheel mass.

A first shut-off element, for example a controllable throttle valve, is arranged on the suction side of the turbocompressor. The region between the first shut-off element and the at least one compressor impeller of the turbocompressor forms a suction-side compressor air space which therefore comprises the space on the suction side of the compressor impeller of the turbocompressor and the pipeline systems which are arranged on the suction side, as far as the first shut-off element.

The turbocompressor is designed in such a way that the suction-side compressor air space is at least largely evacuated, preferably exclusively by the inherent compressor capacity of the turbocompressor, after the first, that is to say suction-side, shut-off element has been closed.

A supercharger which is configured in the sense of the invention is distinguished, above all, by the fact that the supercharger, when it is driven in a sustained manner by the auxiliary motor, requires only a low power output to be provided by the auxiliary motor in order to drive the turbocompressor in this sustained operation when the suction-side first shut-off element is closed. It is possible as a result to operate the turbocompressor of the supercharger in a state in which it is driven in a sustained manner. If the supercharger is not required, in order, for example, to compensate for the turbo lag of an exhaust gas turbocharger, by means of which the internal combustion engine is mainly supercharged, the supercharger can be operated in a "standby mode" and can be kept permanently in operational readiness for the case of sudden load requests. To this end, the first shut-off element is closed. The compressor then evacuates the suction-side compressor space, preferably in an exclusively autonomous manner. As a result of the evacuation of the suction-side compressor space, the compressor has to perform scarcely any more compression work. As a result, the drive power of the auxiliary motor is reduced considerably. The auxiliary motor has to compensate substantially only for the mechanical losses of the turbocompressor, in order to keep the turbocompressor rotational speed at a predefined setpoint rotational speed.

Here, evacuation means generating as great a vacuum as possible in the suction-side compressor space within the scope of the technical possibilities, that is to say as low a pressure as possible in this space. It is understandable that an absolute vacuum, that is to say a compressor space which is absolutely empty of air, naturally cannot be achieved.

As a result of the configuration according to the invention of the supercharger, it is possible to keep the turbocompressor of the supercharger at a predefined setpoint rotational speed during standby operation with a low energy consumption by the auxiliary motor, that is to say to drive its compressor impeller continuously, in order to provide the required boost pressure by rapid response of the additional supercharger when required, for example when the turbocharger which is used in normal operation to supercharge the internal combustion engine is subject to turbo lag and therefore cannot provide the required boost pressure.

It is to be noted that it is possible in principle, however, to also provide the mechanical supercharger which is driven by the auxiliary motor as the sole supercharger of the internal combustion engine. A more rapid provision of a suddenly requested torque in comparison with a non-supercharged internal combustion engine can therefore be made possible. Furthermore, a certain performance increase of the internal combustion engine can also then be achieved.

The advantage of the present invention consists, above all, of the fact that boost pressure is available within a very short time in booster-like manner, in particular to bridge the turbo lag. The duration of the turbo lag lies up to now at approximately from 500 to 1000 ms. The most satisfactory turbochargers at present require approximately 350 ms for running up and therefore can provide their boost pressure only when from 70 to 35% of the duration of the previous turbo lag has already passed. With the aid of the present invention, the required boost pressure is already available, after being called up using control technology, after a reaction time of less than 100 ms, that is to say after less than from 20 to 10% of the duration of the previous turbo lag has passed. This very short reaction time is determined substantially by the quickness of the response of the first shut-off element and the duration of the build up of pressure in the turbocompressor after the first shut-off element is opened. In driving practice, the driver of the vehicle, the internal combustion engine of which is equipped with the supercharger according to the invention, will scarcely still discern, or no longer discern at all, the turbo lag which still remains with a duration of less than 100 ms. The efficiency of the bridging of the turbo lag is increased considerably by the present invention.

The drive power which is consumed by the turbocompressor during standby operation is required mainly to overcome the mechanical losses. However, a small part of the drive power is still required to perform compressor work which is caused by an incomplete evacuation of the suction-side compressor air space. In one advantageous refinement of the invention, the drive power can therefore be reduced further by a second shut-off element being arranged on the pressure side of the turbocompressor, the region between the compressor impeller of the turbocompressor and the second shut-off element forming a pressure-side compressor air space, and a device being provided for substantially evacuating the pressure-side compressor air space. The generation of as good a vacuum as possible in the pressure-side compressor air space, that is to say the generation of as low as possible a negative pressure in the pressure-side compressor air space according to the absolute value within the scope of the technical possibilities, also leads to the negative pressure in the suction-side compressor air space dropping further according to the absolute value. In this context, the device for substantially evacuating the pressure-side compressor air space assists the evacuation of the suction-side compressor air space.

The device for substantially evacuating the pressure-side compressor air space can be, for example, a vacuum pump in the brake system of a vehicle which is driven by the internal combustion engine, or else can be any other desired vacuum pump. As a result, it is possible by utilizing the existing vacuum pumps to evacuate the pressure-side compressor air space and, in an assisting manner to a certain additional extent, the suction-side compressor air space and therefore to further reduce the power consumption of the turbocompressor, and therefore of the auxiliary motor, in standby operation.

The auxiliary motor for driving the turbocompressor can be, for example, an electric motor which is supplied, for example, by the on-board electrical system of a vehicle.

In order to minimize the influence of the electric motor on an on-board electrical system of a vehicle, with the result that, for example, impermissible voltage dips or excessive loading of a vehicle battery do not occur, it is advantageous to limit the current consumption of the electric motor, for example, by way of a control device.

In this context, a further advantage of the present invention becomes clear. In standby operation of the supercharger, the electric motor requires a current in the order of magnitude of approximately 25 A±5 A to drive the turbocompressor, depending on the design. This represents a considerable reduction in the current strength to 10% in comparison with the steady current consumption in conventional superchargers driven by electric motor in the order of magnitude of 250 A. If a vacuum pump is used to evacuate the pressure-side compressor air space, a reduction in the current consumption to less than 10 A or to under 4% of the current consumption of conventional superchargers can be achieved. On account of the low currents, the supercharger according to the invention provides substantially improved electromagnetic compatibility. It develops discernibly less heat and the entire electrical system for the drive of the turbocompressor can be of smaller design; in particular, electrical cables with a substantially thinner cross section can be used.

The turbocompressor can be configured as a radial compressor or as an axial compressor. A radial compressor comprising precisely one compressor impeller with rotational speeds of from 40000 to 70000 rpm is preferably used. In particular, if the turbocompressor is configured as an axial compressor, a plurality of compressor stages which are arranged behind one another in the axial direction can be arranged.

In order for it to be possible to control the transition from standby operation to supercharging operation and the transition from supercharging operation to standby operation, at least the first shut-off element can be actuated actively by a control device in a further advantageous refinement of the invention.

If, according to a further advantageous refinement of the invention, the optionally present second shut-off valve is a nonreturn valve, it is not necessary to provide a control device for the second shut-off element. The second shut-off element then closes automatically as a function of the pressure on the pressure side of the turbocompressor. However, a shut-off element which is actuated actively, for example by a control device, can also be used as a second shut-off element.

For operation, the supercharger requires at least one turbocompressor having at least one compressor impeller and a suction side and a pressure side, a flywheel mass for storing drive energy, an auxiliary motor for driving the compressor impeller and the flywheel mass, and a first shut-off element which is arranged on the suction side of the turbocompressor. The region between the first shut-off element and the compressor impeller forms a suction-side compressor air space which comprises the suction-side spaces of the turbocompressor itself and of the adjacent pipeline systems. The supercharger is usually used in addition to an exhaust gas turbocharger, but can also be used as sole supercharger, in order for it to be possible to meet short term torque requests by the internal combustion engine and/or in order to extend the operating range of the internal combustion engine.

The flywheel mass can also be achieved structurally by a suitable design of the rotating masses of the auxiliary motor and/or of the turbocompressor.

The supercharger is operated together with the internal combustion engine by the compressor impeller of the turbocompressor and the flywheel mass being driven continuously by the auxiliary motor. At operating points, at which it is not necessary to provide an increased boost pressure by way of the turbocompressor, the first shut-off element is closed (called "standby operation" in the above text). The suction-side compressor air space is then preferably evacuated exclusively by means of the inherent compressor capacity of the turbocompressor.

The suction-side compressor air space is evacuated at least largely as a result. That is to say, its pressure is considerably lower than the air pressure of the surroundings.

If the turbocompressor is required to compress the charge air, for example in the case of sudden torque requests made of the internal combustion engine, which torque requests cannot be fulfilled by cooperation of the internal combustion engine with the exhaust gas turbocharger which is used as main supercharger (since, for example, the exhaust gas turbocharger is temporarily not capable of this on account of the turbo lag), the first shut-off element is opened. Air flows from the suction side into the turbocompressor and the air which has flowed in is immediately compressed by said turbocompressor to a requested pressure, since the compressor impeller of the turbocompressor is already rotating at its nominal rotational speed in standby operation and therefore running up of the compressor impeller to the nominal rotational speed is not required. The air which is compressed to the higher boost pressure by the mechanical supercharger can then be made available immediately to the internal combustion engine.

During this supercharging operation, in which the turbocompressor of the supercharger provides boost pressure for the internal combustion engine, in addition to the sustained drive by the auxiliary motor, the driving of the turbocompressor is assisted discernibly by the drive energy which is stored in the flywheel mass.

A drop in the rotational speed of the turbocompressor, after the first shut-off element has been opened and the compressor impeller begins to perform compression work and therefore consumes more power, is reduced by the flywheel mass if the auxiliary motor is not capable of providing the drive moment which is suddenly requested by the turbocompressor.

It is therefore possible to ensure a rapid response of the turbocompressor, for example, when an exhaust gas turbocharger which is used mainly for supercharging the internal combustion engine is not capable of temporarily providing the required boost pressure. The boost pressure is provided immediately, and not only in a delayed manner, since the compressor impeller is always in a state in which it is driven continuously at its nominal rotational speed, and is therefore immediately capable of providing compression work.

In the case of sudden use of the mechanical supercharger, dips in the rotational speed of the compressor impeller and therefore corresponding pressure drops of the charge air which is provided by the turbocompressor can be reduced, by the dips in the rotational speed being reduced by the drive energy which is stored in the flywheel mass. If it is not possible for the auxiliary motor to compensate for a pressure drop in the phase, in which the mechanical supercharger provides the boost pressure for the internal combustion engine, the rotational speed of the compressor impeller drops. This can be the case, for example, when the torque of the auxiliary motor is not sufficient to provide the required drive moment for the turbocompressor, for example because the energy consumption of the auxiliary motor is deliberately limited. In these phases, the drive energy which is stored in the flywheel mass is used additionally to drive the turbocompressor, and the dips in the rotational speed are reduced thereby. In the phase, in which the supercharger is subsequently in standby operation, that is to say at least the first shut-off element is closed and the turbocompressor does not perform any compression work, the rotational speed of the compressor impeller and of the flywheel mass is brought to the nominal rotational speed again by the auxiliary motor.

Since the operating phases of the supercharger are as a rule only short, that is to say lie in the order of magnitude of under one second, since predominantly only the turbo lag of an exhaust gas turbocharger has to be compensated for, only small dips in the rotational speed of the supercharger and therefore only small drops in the boost pressure occur during this time.

As a result of the evacuation of the suction-side compressor air space, the power consumption of the turbocompressor and therefore also of the auxiliary motor are minimized in phases, in which the turbocompressor does not have to perform any work and the first shut-off element is closed, with the result that energetically optimum operation is achieved.

Continuous operation of the supercharger means that the compressor impeller of the turbocompressor of the supercharger is also driven, for example, during idling phases, etc. of the internal combustion engine. However, it is also conceivable to temporarily switch off the auxiliary motor of the supercharger in operating phases, in which it is not to be expected that boost pressure will be called up by the turbocompressor of the supercharger in an immediately imminent time period, for example in relatively long idling phases of the internal combustion engine.

It is additionally advantageous for the method for operating the supercharger to provide a second shut-off element on the pressure side of the turbocompressor, with the result that the region between the compressor impeller of the turbocompressor and the second shut-off element forms a pressure-side compressor air space, and to evacuate the pressure-side compressor air space by means of an additional device for evacuating the pressure-side compressor air space. As a result, the compressor power which is still consumed by the turbocompressor despite as satisfactory an evacuation of the suction-side compressor air space as possible can be reduced even further.

The evacuation of the pressure-side compressor air space can take place by way of one of the devices which, for example, are already present in a vehicle, for example by means of a vacuum pump of a brake system.

In the method for operating a supercharger, it is advantageous to use an electric motor as auxiliary motor. Said electric motor can advantageously be fed by the on-board electrical system of a vehicle, in which the internal combustion engine is used. Therefore, in contrast to other embodiments of the auxiliary motor, for example hydraulic motors, the existing energy supply of the vehicle can be resorted to.

Furthermore, it is advantageous during operation of the supercharger, when an electric motor is used as auxiliary motor, to limit the current which is consumed by the electric motor as a function of the on-board electrical system of the vehicle. For example, a limit in the order of magnitude of approximately 100 A is conceivable in the context of the present invention. In particular, it is advantageous to limit the current in such a way that no great voltage dips occur as a result of the sudden power consumption of the auxiliary motor during the transition from standby operation to supercharging operation, in particular no voltage dips which lead to voltages outside the specification limits of electronic control units of the vehicle. This ensures that all the control units of the vehicle operate reliably during the entire operation.

It is advantageous to actuate at least the first shut-off element actively by a control device, whereas the optionally existing second shut-off element optionally can either be actuated, for example, by a corresponding control unit or else can move autonomously into the closed state, by being configured as a nonreturn valve.

EXEMPLARY EMBODIMENTS

Embodiments of the invention will be described in the following text using the appended drawings, in which.

Figure 1:
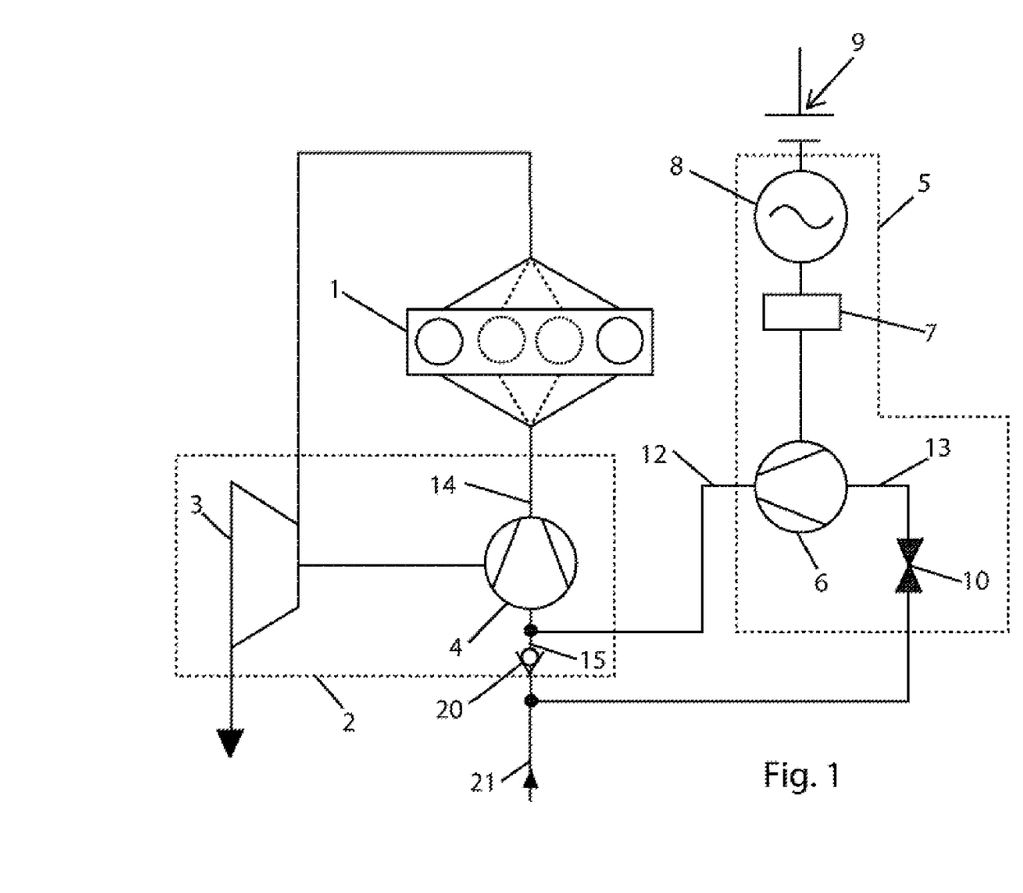
FIG. 1 shows an arrangement of internal combustion engine, exhaust gas turbocharger and an additional supercharger according to the invention.

FIG. 1 shows an arrangement, in which an internal combustion engine 1 is supplied with boost pressure by an exhaust gas turbocharger 2 in normal operation, the exhaust gas turbocharger 2 being assisted additionally by a mechanical supercharger 5, called a supercharger in the following text. The air which is compressed by the turbocompressor 6 of the supercharger 5 is fed in on the suction side 15 of the compressor 4 of the exhaust gas turbocharger 2. The suction side 15 of the exhaust gas turbocharger 2 and the pressure side 12 of the supercharger 5 are therefore connected to one another in the arrangement which is shown in FIG. 1. Moreover, a nonreturn valve 20 is provided, in order to prevent the boost pressure which is generated by the turbocompressor 6 on the pressure side 12 from blowing back into the intake line 21.

The exhaust gas turbocharger 2 consists of a turbine 3 which is operated by way of the exhaust gas mass flow of the internal combustion engine 1 and drives the compressor 4 of the exhaust gas turbocharger 2. The air which is sucked in through the intake line 21 by the compressor 4 of the exhaust gas turbocharger 2 on the suction side 15 is compressed toward the pressure side 14 of the compressor 4 and is then subsequently fed to the internal combustion engine 1.

The supercharger 5 comprises a turbocompressor 6 which is driven by an auxiliary motor 8. The auxiliary motor 8 also drives the flywheel mass 7.

FIG. 1 shows the auxiliary motor 8 as an electric motor which is supplied with energy by an on-board electrical system 9. However, any other desired embodiments of auxiliary motors can also be used.

The turbocompressor 6 of the supercharger 5 has a suction side 13 and a pressure side 12. A shut-off element 10 is arranged on the suction side 13.

At an operating point, at which the exhaust gas turbocharger 2 is not capable alone of providing a requested boost pressure, by way of which the torque which is requested from the internal combustion engine 1 can be achieved, on account of an excessively low exhaust gas mass flow, the additionally required boost pressure is provided by the turbocompressor 6 of the supercharger 5.

The shut-off element 10 is open in this "supercharging operation". Through the shut-off element 10 and the suction side of the turbocompressor 6, air is sucked in by the turbocompressor 6 through the intake line 21 which, for example, comes from an air filter (not shown here) of a vehicle. The air is compressed by the turbocompressor 6. In the configuration which is shown in FIG. 1, the charge air which is provided by the supercharger 5 is fed to the suction side 15 of the compressor 4, and the air mass flow which is combined from the air from the exhaust gas turbocharger 2 and the supercharger 5 then flows jointly into the cylinders of the internal combustion engine 1.

If the compressor capacity of the compressor 4 of the exhaust gas turbocharger 2 is sufficient alone to provide the boost pressure which is required for the torque which is requested from the internal combustion engine 1, the supercharger 5 is operated in standby operation. To this end, first of all the shut-off element 10 is closed. The auxiliary motor 8 continues to drive the turbocompressor 6 of the supercharger 5. It is therefore also the case in standby operation that the compressor impeller 17 (shown in FIG. 3) of the turbocompressor 6 of the supercharger 5 is driven continuously by the auxiliary motor 8. Merely in certain operating states, in which it is foreseeable that no more boost pressure has to be provided by the supercharger 5 over a relatively long time, it is conceivable to switch off the supercharger 5 completely, for example, in relatively long idling phases of the internal combustion engine.

Figure 3:
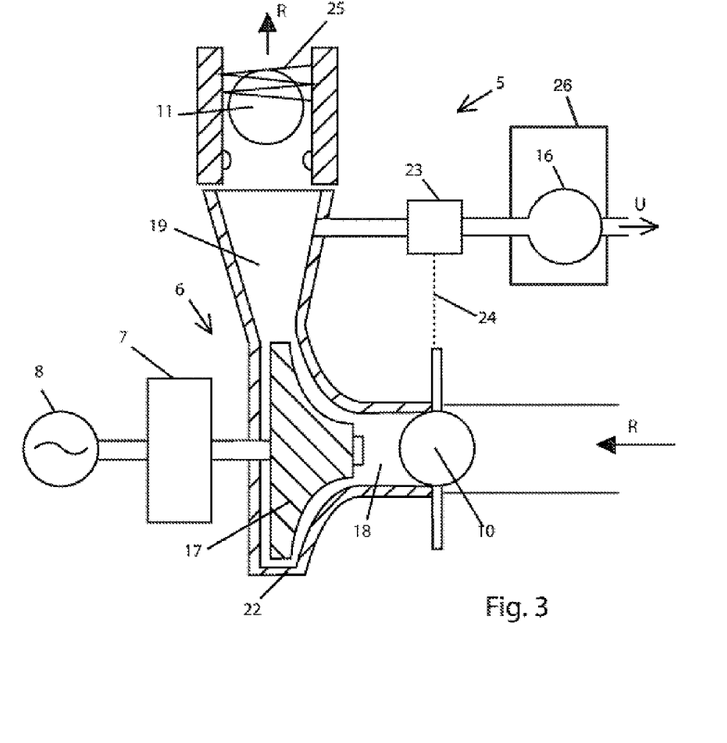
FIG. 3 shows one embodiment of the supercharger according to the invention with a vacuum pump, in which embodiment the turbocompressor is configured as a radial compressor.

In the standby phase, the turbocompressor 6 automatically evacuates the suction-side compressor air space 18 which can be seen in FIG. 3, lies between the compressor impeller 17 and the shut-off element 10, and is delimited by the suction-side walls of the housing of the turbocompressor 6.

If the suction-side compressor air space 18 has been largely evacuated by the turbocompressor 6, the compression work to be performed by the turbocompressor 6 is reduced considerably as a result. In the case of a total vacuum which cannot be achieved in practice, however, it would even be the case that no compression work at all would be carried out. In this operating state, the auxiliary motor 8 then merely has to cover the friction losses of the turbocompressor 6 and, in the case of a vacuum which is not total, merely has to perform a small amount of additional compression work. As a result, the energy consumption of the auxiliary motor 8 is very low in this operating state.

At the same time, it is ensured that the compressor impeller 17 of the turbocompressor 6 of the supercharger 5 also rotates in standby operation continuously at a predefined rotational speed, in order to provide the desired boost pressure immediately in the case of the sudden transition into supercharging operation of the supercharger 5, without it being necessary beforehand to first of all bring the supercharger 5 to its nominal rotational speed. Therefore, by a running up phase of the supercharger 5 being avoided during the transition from standby to supercharging operation, the boost pressure which is required for the internal combustion engine can be provided considerably more rapidly, and the internal combustion engine 1 can output the requested torque immediately.

Since the exhaust gas turbocharger 2 is as a rule capable again, after a short time which is in the order of magnitude of one second and less, of providing the boost pressure which is requested by the internal combustion engine 1 alone without the additional supercharger 5, the supercharger 5 can switch into the standby phase again after this time period has elapsed. Here, the suction-side shut-off element 10 is closed, as described above. The turbocompressor 6 then evacuates the suction-side compressor air space 18 between the shut-off element 10 and the compressor impeller 17. The auxiliary motor 8 continues to drive the turbocompressor 6 and the flywheel mass 7. It therefore has to provide only a small amount of energy for this purpose, however, on account of the low power consumption of the turbocompressor 6.

Depending on the level of the torque which is provided by the auxiliary motor 8, dips in the rotational speed of the turbocompressor 6 can occur during supercharging operation of the supercharger 5, since the compression work which is to be performed on the compressed charge air by the turbocompressor 6 is greater than the drive torque which is provided by the auxiliary motor 8. This can result firstly from the dimensions of the auxiliary motor 8, but secondly also as a result of the fact that, for example in the case in which the auxiliary motor 8 is an electric motor which is supplied with current by the on-board electrical system, the current consumption of the electric motor is limited, in order not to bring about, for example, any impermissible voltage dips of the vehicle on-board electrical system. In this case, excessive dips in the rotational speed on account of the difference between the torque which is requested by the turbocompressor 6 and the torque which is output by the auxiliary motor 8 are compensated for by the drive energy which is stored in the flywheel mass 7. The drive energy which is stored by the flywheel mass 7 ensures at least temporarily that the rotational speed of the compressor impeller 17 of the turbocompressor 6 is at least largely maintained during the sudden transition from standby to supercharging operation and does not drop too excessively below the nominal rotational speed, with the result that the turbocompressor 6 of the supercharger 5 can also continue to provide sufficient boost pressure, as requested. Since the operating phases of the supercharger 5 are as a rule shorter than one second, since usually merely the turbo lag of the exhaust gas turbocharger 2 has to be compensated for, merely low dips in the rotational speed occur on account of the mode of operation of the flywheel mass 7.

In the standby phase which follows the supercharging phase and in which the turbocompressor 6 requires only a low amount of drive power, the system comprising turbocompressor 6, flywheel mass 7 and auxiliary motor 8 is brought slowly to the nominal rotational speed again by the auxiliary motor 8. The flywheel mass 7 then again stores drive energy which is then again used as described above in the following supercharging phase to additionally drive the turbocompressor 6 as well as to drive the turbocompressor 6 by the auxiliary motor 8.

Figure 2:
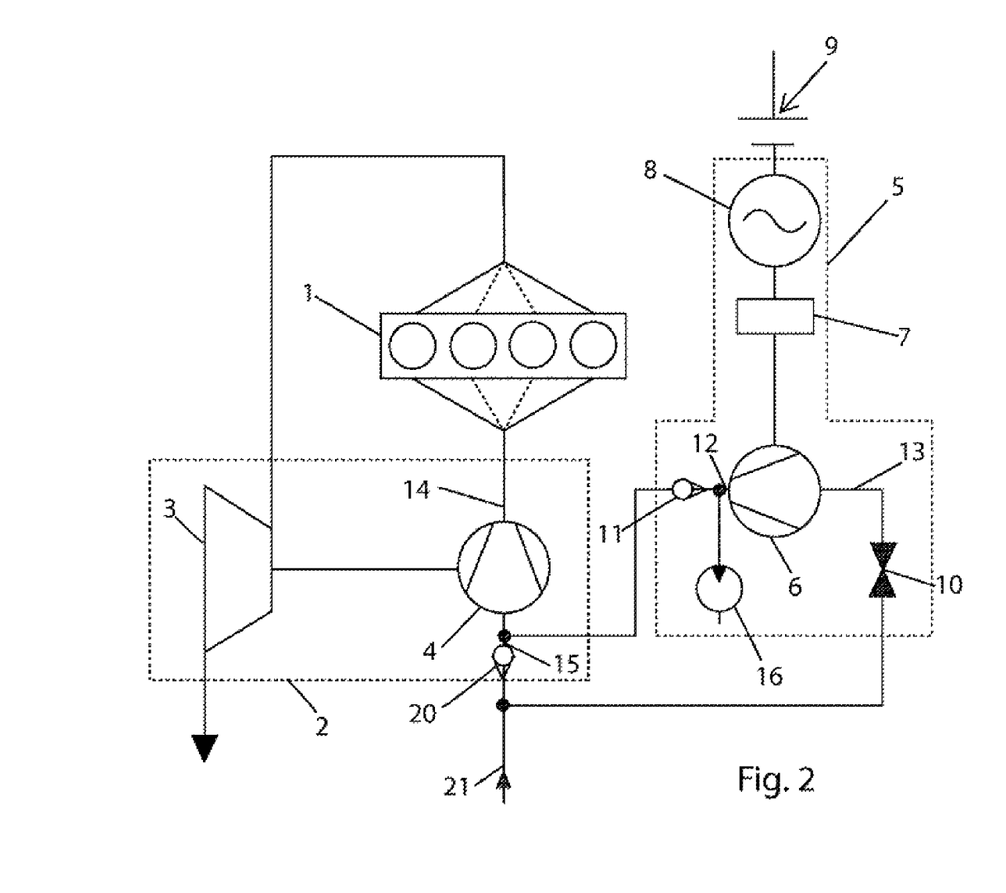
FIG. 2 shows an arrangement of internal combustion engine, exhaust gas turbocharger and an additional supercharger according to the invention, the pressure-side compressor air space of the additional supercharger according to the invention being evacuated by a vacuum pump.

FIG. 2 shows a further advantageous embodiment. In said embodiment, in a deviation from the embodiment which is shown in FIG. 1, a second shut-off element 11 in the form of a nonreturn valve and a vacuum pump 16 are arranged on the pressure side 12 of the turbocompressor 6. The vacuum pump 16 is connected to the pressure-side compressor air space 19 (which can be seen in FIG. 3) of the supercharger 5 on the pressure side 12 of the turbocompressor 6. The pressure-side compressor air space 19 is evacuated by said vacuum pump 16 during the transition into the standby phase after the shut-off element 10 is closed. Here, the shut-off element 11 which is configured as a nonreturn valve closes automatically. As a result of this evacuation of the pressure-side compressor air space 19, which evacuation can also result in a further improvement of the vacuum in the suction-side compressor air space 18, the compression work which is performed by the turbocompressor 6 and therefore the power consumption of the auxiliary motor in standby operation can be reduced further.

Directly after the transition of the supercharger 5 from the standby phase to supercharging operation, the shut-off element 11 which is configured as a nonreturn valve opens automatically, in order to allow the intake air which is compressed by the turbocompressor 6 of the supercharger 5 to flow through the compressor 4 of the exhaust gas turbocharger 2 to the internal combustion engine 1. In a deviation from the illustration in FIG. 2, the shut-off element 11 can also be configured as an actuable valve which is opened and closed by an external controller.

The vacuum pump 16 can be a vacuum pump which is provided specifically for the supercharger 5. However, a vacuum pump which is already present in a vehicle, in which the internal combustion engine is used, is advantageously used. For this purpose, the vacuum pump of the brake system 26 may be suitable, in particular.

FIG. 3 shows one embodiment of the supercharger 5 according to the invention, in which the turbocompressor 6 is configured as a radial compressor with precisely one compressor impeller 17. The compressor impeller 17 which is provided with compressor blades in a manner known per se divides the space which is enclosed laterally by the compressor housing 22 into a suction-side compressor air space 18 on one side and a pressure-side compressor air space 19 on the other side. In the embodiment which is shown, the compressor air spaces 18 and 19 are delimited in the throughflow direction R, in which the supercharger 5 is flowed through by the air which is to be compressed or is compressed, on the suction side by a shut-off element 10 which is configured as a pivotable throttle valve and on the pressure side by a shut-off element 11 which is configured as a nonreturn valve. The ball of the nonreturn valve is prestressed into its closed position by means of a spring 25. A vacuum pump 16 which is already present in the relevant vehicle for other purposes is connected to the pressure-side compressor air space 19 via a solenoid valve 23. The solenoid valve 23 is connected to the shut-off element 10 via a control line 24.

In standby operation, the shut-off element 10 is closed and the solenoid valve 23 is open. Accordingly, the suction-side compressor air space 18 is evacuated with the aid of the inherent compressor capacity of the compressor impeller 17, whereas the pressure-side compressor air space 19 is evacuated in accordance with arrow U with the aid of the vacuum pump 16. The shut-off element 11 has closed automatically on account of the dropping pressure in the pressure-side compressor air space 19. The compressor impeller 17 rotates at its nominal rotational speed, the auxiliary motor 8 which is configured as an electric motor driving the compressor impeller 17 and the flywheel mass 7 with a low current consumption.

If the supercharger 5 is to provide boost pressure, the solenoid valve 23 is opened and, at the same time via the control line 24, the shut-off element 10 is opened. The vacuum pump 16 is then disconnected from the pressure-side compressor air space 19, and the compressor impeller 17 suddenly sucks in air for compression through the open shut-off element 10 and the suction-side compressor air space 18. The compressed air is likewise fed suddenly through the pressure-side compressor air space 19 and the automatically opening shut-off element 11 to the pressure side 15 (shown in FIG. 2) of the compressor 4 of the exhaust gas turbocharger 2.

If an additional vacuum pump which serves exclusively for evacuating the pressure-side compressor air space 19 in standby operation and otherwise does not perform any further tasks for other vehicle systems is provided in the vehicle as vacuum pump 16, the solenoid valve 23 which is shown in FIG. 3 can be omitted and the additional vacuum pump can be actuated directly for the purposes of the transition between standby operation and supercharging operation.

The internal combustion engine 1 can be a gasoline engine or a diesel engine. As a result of the present invention, it is possible, if a diesel engine is used, to set an optimum compression ratio in said diesel engine of approximately 14:1 (in comparison with the previously achieved compression ratios of the order of magnitude of 15.8:1). As a result, the ignition behavior of the diesel engine can be optimized, for example.

LIST OF DESIGNATIONS

1 Internal combustion engine
2 Exhaust gas turbocharger
3 Turbine of the exhaust gas turbocharger
4 Compressor of the exhaust gas turbocharger
5 Supercharger
6 Compressor of the supercharger
7 Flywheel mass
8 Auxiliary motor
9 Energy supply
10 First shut-off element
11 Second shut-off element
12 Pressure side of the supercharger
13 Suction side of the supercharger
14 Pressure side of the exhaust gas turbocharger
15 Suction side of the exhaust gas turbocharger
16 Vacuum pump
17 Compressor impeller
18 Suction-side compressor air space
19 Pressure-side compressor air space
20 Nonreturn valve
21 Intake line
22 Compressor housing
23 Solenoid valve
24 Control line
25 Spring
26 Brake system

The invention claimed is:

1. A method for operating a supercharger together with an internal combustion engine, the supercharger having a turbocompressor with at least one compressor impeller and with a suction side and a pressure side, an auxiliary motor for driving the compressor impeller, a flywheel mass for storing drive energy, and a first shut-off element which is arranged on the suction side of the turbocompressor, the region between the first shut-off element and the compressor impeller of the turbocompressor forming a suction-side compressor air space; the method comprising:
constant driving of the at least one compressor impeller of the turbocompressor and the flywheel mass by the auxiliary motor;
closing of the first shut-off element and substantially evacuating the suction-side compressor air space by an inherent compressor capacity of the turbocompressor, thereby performing a standby operation of the supercharger; and
opening of the first shut-off element only when the internal combustion engine cannot provide a predefined torque, the auxiliary motor being assisted, during driving of the compressor impeller of the turbocompressor, by the drive energy which is stored in the flywheel mass, thereby performing a supercharging operation of the supercharger;
wherein the auxiliary motor is an electric motor and is supplied with an electric current during both the standby operation and the supercharging operation by an on-board electrical system of a vehicle which comprises the internal combustion engine, and wherein the electric current which is drawn by the electric motor is limited.

2. The method as claimed in claim 1, wherein the supercharger is used in addition to an exhaust gas turbocharger, and the first shut-off element is opened only when the internal combustion engine cannot provide a predefined torque solely in cooperation with the exhaust gas turbocharger.

3. The method as claimed in claim 1 or 2, wherein the supercharger has a second shut-off element on the pressure side of the turbocompressor, the region between the compressor impeller of the turbocompressor and the second shut-off element forms a delivery-side compressor air space, and the method additionally comprises substantially evacuating the delivery-side compressor air space.

4. The method as claimed in claim 3, wherein the evacuation of the delivery-side compressor air space takes place by means of a vacuum pump of a brake system of a vehicle which comprises the internal combustion engine.

5. The method as claimed in claim 3, wherein the second shut-off element is transferred into a closed state in the context of the operation of evacuating the delivery-side compressor air space.

6. The method as claimed in claim 5, wherein the second shut-off element passes automatically into the closed state.

7. The method as claimed in claim 1, wherein the electric current is limited in such a way that the on-board electrical system does not experience any voltage dip which lies outside predefined specification limits of electronic control units of the vehicle.

8. The method as claimed in claim 1, wherein at least the first shut-off element is actuated actively by a control device.

9. The method as claimed in claim 1, wherein the electric current which is drawn by the electric motor is limited to 100 Amperes.

10. A supercharger for an internal combustion engine, comprising:
   a turbocompressor having at least one compressor impeller, the turbocompressor having a suction side and a pressure side;
   a flywheel mass for storing drive energy;
   an auxiliary motor for driving the compressor impeller and the flywheel mass; and
   a first shut-off element which is arranged on the suction side of the turbocompressor, wherein a supercharging operation mode of the supercharger is defined when the first shut-off element is in its opened condition;
   the region between the first shut-off element and the compressor impeller of the turbocompressor forming a suction-side compressor air space, and the turbocompressor being designed in such a way that, after the first shut-off element is closed, the suction-side compressor air space is configured to be substantially evacuated by an inherent compressor capacity of the turbocompressor thereby defining a standby operation mode of the supercharger;
   wherein the auxiliary motor is an electric motor which is supplied with an electric current in both the standby operation mode and the supercharging operation mode by an on-board electrical system of a vehicle and the supercharger further comprises a control device configured to limit the electric current draw of the electric motor.

11. The supercharger as claimed in claim 10, wherein a second shut-off element is arranged on the pressure side of the turbocompressor, the region between the compressor impeller of the turbocompressor and the second shut-off element forms a delivery-side compressor air space, and further comprising a pump configured to substantially evacuate the delivery-side compressor air space.

12. The supercharger as claimed in claim 11, wherein the device for substantially evacuating the delivery-side compressor air space is a vacuum pump of a brake system of a vehicle.

13. The supercharger as claimed in claim 11, characterized in that the second shut-off element is a nonreturn valve.

14. The supercharger as claimed in claim 10, wherein the turbocompressor is a radial compressor.

15. The supercharger as claimed in claim 10, wherein at least the first shut-off element is configured to be actuated actively by a control device.

16. The supercharger as claimed in claim 10, wherein the control device is further configured to limit the electric current draw of the electric motor to 100 Amperes.

* * * * *